(12) United States Patent
Xu et al.

(10) Patent No.: US 11,288,839 B2
(45) Date of Patent: Mar. 29, 2022

(54) SUPERMARKET SHOPPING CART POSITIONING METHOD, SUPERMARKET SHOPPING CART POSITIONING SYSTEM, AND SUPERMARKET SHOPPING CART

(71) Applicant: BOE TECHNOLOGY GROUP CO., LTD., Beijing (CN)

(72) Inventors: Jingtao Xu, Beijing (CN); Jianwen Suo, Beijing (CN); Yue Li, Beijing (CN); Bo Xu, Beijing (CN); Zhiguo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 8 days.

(21) Appl. No.: 16/633,393

(22) PCT Filed: Jul. 3, 2019

(86) PCT No.: PCT/CN2019/094574
§ 371 (c)(1),
(2) Date: Jan. 23, 2020

(87) PCT Pub. No.: WO2020/007323
PCT Pub. Date: Jan. 9, 2020

(65) Prior Publication Data
US 2020/0234465 A1     Jul. 23, 2020

(30) Foreign Application Priority Data
Jul. 3, 2018     (CN) .......................... 201810711492.3

(51) Int. Cl.
G06T 7/73     (2017.01)
G06T 7/11     (2017.01)
(Continued)

(52) U.S. Cl.
CPC .................. *G06T 7/74* (2017.01); *G06T 7/11* (2017.01); *G06T 7/174* (2017.01); *G06T 7/248* (2017.01); *G06T 2207/30232* (2013.01)

(58) Field of Classification Search
CPC .......... G06T 2207/30232; G06T 7/248; G06T 7/174; G06T 7/11; G06T 7/74
See application file for complete search history.

(56) References Cited

U.S. PATENT DOCUMENTS 6,470,267 B1    10/2002  Nozaki
7,503,490 B1 *  3/2009   Bobbitt ................ G06Q 20/208
                                                235/383
(Continued)

FOREIGN PATENT DOCUMENTS

CN      103575293 A     2/2014
CN      103995250 A     8/2014
(Continued)

OTHER PUBLICATIONS

International Search Report of PCT/CN2019/094574 in Chinese, dated Sep. 26, 2019, with English translation.
(Continued)

*Primary Examiner* — Mia M Thomas
(74) *Attorney, Agent, or Firm* — Collard & Roe, P.C.

(57) ABSTRACT

A method for positioning a supermarket shopping cart, a system for positioning a supermarket shopping cart and a supermarket shopping cart. A method for positioning a supermarket shopping cart provided by the present disclosure includes: acquiring a first reference image of a supermarket, and processing a first reference image to obtain a partition in which a shopping cart is located as a positioning partition, in which the supermarket comprises a plurality of partitions; receiving distance information sent by at least one signal transmitter provided in the positioning partition, in which each partition is provided with at least one signal (Continued)

transmitter; and obtaining a first positioning position of the shopping cart, according to distance information sent by at least one signal transmitter corresponding to the positioning partition, and determining an actual position of the shopping cart based on the first positioning position of the shopping cart.

18 Claims, 5 Drawing Sheets

(51) Int. Cl.
*G06T 7/174* (2017.01)
*G06T 7/246* (2017.01)

(56) References Cited

U.S. PATENT DOCUMENTS

| | | | | |
|---|---|---|---|---|
| 8,229,158 | B2* | 7/2012 | Connell, II | G06Q 30/06 382/100 |
| 8,317,086 | B2* | 11/2012 | Dudek | G06Q 20/209 235/375 |
| 9,202,105 | B1* | 12/2015 | Wang | G06F 21/32 |
| 9,679,327 | B2* | 6/2017 | Herring | G01S 19/13 |
| 9,702,957 | B2 | 7/2017 | Peng et al. | |
| 9,984,362 | B2* | 5/2018 | Aidasani | G06Q 20/4012 |
| 10,088,549 | B2* | 10/2018 | Nielsen | G06T 7/292 |
| 10,157,413 | B2* | 12/2018 | Landers, Jr. | G06K 9/209 |
| 10,672,051 | B2* | 6/2020 | Herring | G01B 11/00 |
| 10,825,068 | B2* | 11/2020 | Landers, Jr. | H04N 7/181 |
| 2009/0268939 | A1* | 10/2009 | Connell, II | G06Q 30/06 382/100 |
| 2010/0053329 | A1* | 3/2010 | Flickner | G06Q 30/0603 348/150 |
| 2016/0300212 | A1* | 10/2016 | Cordova | G07G 3/003 |
| 2016/0364788 | A1* | 12/2016 | Jo | G06K 9/325 |
| 2018/0025500 | A1* | 1/2018 | Nielsen | G01S 5/0263 382/103 |
| 2018/0211300 | A1* | 7/2018 | Tovey | G06T 7/62 |
| 2018/0225647 | A1* | 8/2018 | Cordova | G07G 3/003 |
| 2019/0096198 | A1* | 3/2019 | Landers, Jr. | G06Q 20/322 |
| 2019/0304150 | A1* | 10/2019 | Zweigle | H04N 13/271 |
| 2019/0354773 | A1* | 11/2019 | Leizerovich | G08B 13/19608 |
| 2019/0354774 | A1* | 11/2019 | Leizerovich | G06K 9/00711 |
| 2019/0354775 | A1* | 11/2019 | Leizerovich | H04N 7/181 |
| 2019/0354776 | A1* | 11/2019 | Ribeiro | G08B 13/19647 |
| 2019/0356885 | A1* | 11/2019 | Ribeiro | G06T 7/70 |
| 2020/0151696 | A1* | 5/2020 | Plocher | G06Q 20/202 |
| 2020/0193202 | A1* | 6/2020 | Polese Cossio | G06K 9/22 |
| 2021/0019725 | A1* | 1/2021 | Xiao | G06Q 30/0185 |
| 2021/0063159 | A1* | 3/2021 | Li | G01C 21/005 |
| 2021/0067746 | A1* | 3/2021 | Yones | H04N 9/045 |

FOREIGN PATENT DOCUMENTS

| | | |
|---|---|---|
| CN | 105093172 A | 11/2015 |
| CN | 105438346 A | 3/2016 |
| CN | 103281778 B | 4/2016 |
| CN | 105548961 A | 5/2016 |
| CN | 106372556 A | 2/2017 |
| CN | 107766114 A | 3/2018 |
| CN | 107770858 A | 3/2018 |
| CN | 107883950 A | 4/2018 |
| CN | 108845289 A | 11/2018 |
| CN | 106793078 B | 12/2019 |

OTHER PUBLICATIONS

Chinese Office Action in Chinese Application No. 201810711492.3, dated Mar. 2, 2020 with English translation.

* cited by examiner

SUPERMARKET SHOPPING CART POSITIONING METHOD, SUPERMARKET SHOPPING CART POSITIONING SYSTEM, AND SUPERMARKET SHOPPING CART

This application is the National Stage of PCT/CN2019/094574 filed on Jul. 3, 2019, which claims priority under 35 U.S.C. § 119 of Chinese Application No. 201810711492.3 filed on Jul. 3, 2018, the disclosure of which is incorporated by reference.

TECHNICAL FIELD

Embodiments of the present disclosure relate to a method for positioning a supermarket shopping cart, a system for positioning a supermarket shopping cart and a supermarket shopping cart.

BACKGROUND

At present, intelligent shopping carts generally include a positioning function, and existing intelligent shopping carts typically adopt wireless positioning or visual positioning. However, wireless positioning methods such as Bluetooth positioning and WIFI positioning have poor accuracy and are obviously interfered by the environment. The size of a passable partition in a supermarket is always not much different from the positioning accuracy of Bluetooth or WIFI positioning or is smaller than this positioning accuracy, causing larger positioning deviation of an intelligent shopping cart and bad user experience. Although the visual positioning using image acquisition has higher positioning accuracy, it requires a large amount of positioning calculation and has higher requirements on a processing module. Electronic products on the intelligent shopping cart cannot meet the requirements of the visual positioning on the processing module.

SUMMARY

At least one embodiment of the present disclosure provides a method for positioning a supermarket shopping cart, which includes: acquiring a first reference image of a supermarket, and processing a first reference image to obtain a partition in which a shopping cart is located as a positioning partition, in which the supermarket comprises a plurality of partitions; receiving distance information sent by at least one signal transmitter provided in the positioning partition, in which each partition is provided with at least one signal transmitter; and obtaining a first positioning position of the shopping cart, according to distance information sent by at least one signal transmitter corresponding to the positioning partition, and determining an actual position of the shopping cart based on the first positioning position of the shopping cart.

For example, in the method for positioning a supermarket shopping cart provided by at least one embodiment of the present disclosure, determining the actual position of the shopping cart based on the first positioning position of the shopping cart, comprises: taking a first positioning position of a first shopping cart as the actual position of the shopping cart.

For example, the method for positioning a supermarket shopping cart provided by at least one embodiment of the present disclosure further comprises: obtaining a plurality of first positioning positions of the shopping cart for a plurality of continuous time instants, determining a plurality of partitions corresponding to a plurality of first positioning positions respectively, and determining a partition with a largest number among the plurality of partitions corresponding to the plurality of first positioning positions as a current partition; in a case where the current partition is different from the positioning partition, acquiring a second reference image of the supermarket again, processing the second reference image to obtain a second positioning position of the shopping cart, and replacing a first positioning position corresponding to a last time instant in the plurality of continuous time instants with a second positioning position in order to serve as the actual position of the shopping cart; and in a case where the current partition is the same as the positioning partition, taking the first positioning position corresponding to the last time instant in the plurality of continuous time instants as the actual position of the shopping cart.

For example, in the method for positioning a supermarket shopping cart provided by at least one embodiment of the present disclosure, the supermarket comprises a shelf partition and a passage partition, and the passage partition comprises a plurality of grids connected in sequence; and the method for positioning a supermarket shopping cart further comprises: obtaining a first positioning position of the shopping cart corresponding to a first time instant and a first positioning position of the shopping cart corresponding to a second time instant; calculating distances between a first positioning position corresponding to the first time instant and center points of all grids in the supermarket in order to obtain a first set of distance values, calculating distances between a first positioning position corresponding to the second time instant and the center points of all grids in the supermarket in order to obtain a second set of distance values, selecting respectively a minimum distance value for the first time instant in the first set of distance values and a minimum distance value for the second time instant in the second set of distance values, and comparing a distance difference between the minimum distance value for the first time instant and the minimum distance value for the second time instant to a first preset distance value; in a case where the distance difference is less than or equal to the first preset distance value, taking a position of a center point of a grid corresponding to the minimum distance value for the second time instant corresponding to the second time instant as the actual position of the shopping cart; and in a case where the distance difference value is greater than the first preset distance value, correcting the actual position of the shopping cart by a magnetometer.

For example, in the method for positioning a supermarket shopping cart provided by at least one embodiment of the present disclosure, correcting the actual position of the shopping cart by a magnetometer sensor comprises: obtaining first angle detecting information of the magnetometer at the first time instant and second angle detecting information of the magnetometer at the second time instant, and calculating to obtain an angle difference between the first time instant and the second time instant; in a case where the angle difference is less than or equal to a preset angle value, taking a position of a center point of a grid corresponding to the minimum distance value for the first time instant corresponding to the first time instant as the actual position of the shopping cart; in a case where the angle difference is greater than the preset angle value and the distance difference is less than or equal to a second preset distance value, taking the position of the center point of the grid corresponding to the minimum distance value for the second time instant corresponding to the second time instant as the actual position of the shopping cart; and in a case where the angle difference is greater than the preset angle value and the distance difference is greater than the second preset distance value, taking the position of the center point of the grid corresponding to the minimum distance value for the first time instant corresponding to the first time instant as the actual position of the shopping cart.

For example, in the method for positioning a supermarket shopping cart provided by at least one embodiment of the present disclosure, the positioning partition corresponds to at least three signal transmitters, and obtaining the first positioning position of the shopping cart according to the distance information sent by at least one signal transmitter corresponding to the positioning partition comprises: obtaining at least three distance information sent by at least three signal transmitters corresponding to the positioning partition; determining minimum three distance information among at least three distance information and position coordinates of three signal transmitters corresponding to the minimum three distance information; and obtaining the first positioning position of the shopping cart based on a three-point weighted centroid positioning algorithm, according to the minimum three distance information and the position coordinates of the three signal transmitters.

For example, in the method for positioning a supermarket shopping cart provided by at least one embodiment of the present disclosure, the supermarket further comprises a plurality of preset identifiers, each partition corresponds to at least one preset identifier, the plurality of preset identifiers comprise a first preset identifier, and the first reference image contains a first preset identifier in the supermarket, and processing the first reference image to obtain the partition in which the shopping cart is located as the positioning partition, comprises: processing the first reference image to identify a first preset identifier in the first reference image; and determining the partition in which the shopping cart is located as the positioning partition, according to the first preset identifier.

For example, in the method for positioning a supermarket shopping cart provided by at least one embodiment of the present disclosure, the partition in which the shopping cart is located corresponds to the first preset identifier in the first reference image.

For example, in the method for positioning a supermarket shopping cart provided by at least one embodiment of the present disclosure, the plurality of preset identifiers further comprise a second preset identifier, and a second reference image contains the second preset identifier.

At least one embodiment of the present disclosure provides a system for positioning a supermarket shopping cart, which includes: an image acquisition device, configured to acquire a first reference image of a supermarket, in which the supermarket comprises a plurality of partitions; a wireless communication device, configured to receive distance information sent by a plurality of signal transmitters in the supermarket; and a processing device, configured to receive a first reference image, process the first reference image to obtain and determine a partition in which a shopping cart is located as a positioning partition, obtain a first positioning position of the shopping cart according to distance information sent by at least one signal transmitter corresponding to the positioning partition, and determine an actual position of the shopping cart based on the first positioning position of the shopping cart.

For example, in the system for positioning a supermarket shopping cart provided by at least one embodiment of the present disclosure, the processing device is configured to: take the first positioning position of the first shopping cart as the actual position of the shopping cart.

For example, in the system for positioning a supermarket shopping cart provided by at least one embodiment of the present disclosure, the processing device is further configured to: obtain a plurality of first positioning positions of the shopping cart for a plurality of continuous time instants, determine a plurality of partitions corresponding to a plurality of first positioning positions respectively, and determine a partition with a largest number among the plurality of partitions corresponding to the plurality of first positioning positions as a current partition; in a case where the current partition is different from the positioning partition, the image acquisition device is further configured to acquire a second reference image of the supermarket again, and the processing device is further configured to process a second reference image to obtain a second positioning position of the shopping cart, and replace a first positioning position corresponding to a last time instant in the plurality of continuous time instants with a second positioning position in order to serve as the actual position of the shopping cart; and in a case where the current partition is the same as the positioning partition, the processing device is further configured to take the first positioning position corresponding to the last time instant in the plurality of continuous time instants as the actual position of the shopping cart.

For example, the system for positioning a supermarket shopping cart provided by at least one embodiment of the present disclosure further comprises a magnetometer fixable on the shopping cart. The supermarket comprises a shelf partition and a passage partition, and the passage partition comprises a plurality of grids connected in sequence. And the processing device is further configured to: obtain a first positioning position of the shopping cart corresponding to a first time instant and a first positioning position of the shopping cart corresponding to a second time instant; calculate distances between a first positioning position corresponding to the first time instant and center points of all grids in the supermarket in order to obtain a first set of distance values, calculate distances between a first positioning position corresponding to the second time instant and the center points of all grids in the supermarket in order to obtain a second set of distance values, select respectively a minimum distance value for the first time instant in the first set of distance values and a minimum distance value for the second time instant in the second set of distance values, and compare a distance difference between the minimum distance value for the first time instant and the minimum distance value for the second time instant to a first preset distance value; in a case where the distance difference is less than or equal to the first preset distance value, take a position of a center point of a grid corresponding to the minimum distance value for the second time instant corresponding to the second time instant as the actual position of the shopping cart; and in a case where the distance difference value is greater than the first preset distance value, correct the actual position of the shopping cart by the magnetometer.

For example, in the system for positioning a supermarket shopping cart provided by at least one embodiment of the present disclosure, the processing device is further configured to: obtain first angle detecting information of the magnetometer at the first time instant and second angle detecting information of the magnetometer at the second time instant, and calculate an angle difference between the first time instant and the second time instant; in a case where the angle difference is less than or equal to a preset angle value, take a position of a center point of a grid corresponding to the minimum distance value for the first time instant corresponding to the first time instant as the actual position of the shopping cart; in a case where the angle difference is greater than the preset angle value and the distance difference is less than or equal to a second preset distance value, take the position of the center point of the grid corresponding to the minimum distance value for the second time instant corresponding to the second time instant as the actual position of the shopping cart; and in a case where the angle difference is greater than the preset angle value and the distance difference is greater than the second preset distance value, take the position of the center point of the grid corresponding to the minimum distance value for the first time instant corresponding to the first time instant as the actual position of the shopping cart.

For example, in the system for positioning a supermarket shopping cart provided by at least one embodiment of the present disclosure, the positioning partition corresponds to at least three signal transmitters, and the processing device is configured to: obtain at least three distance information sent by at least three signal transmitters corresponding to the positioning partition; determine the minimum three distance information among at least three distance information and position coordinates of three signal transmitters corresponding to the minimum three distance information; and obtain the first positioning position of the shopping cart based on a three-point weighted centroid positioning algorithm, according to the minimum three distance information and the position coordinates of three signal transmitters.

For example, in the system for positioning a supermarket shopping cart provided by at least one embodiment of the present disclosure, the supermarket further comprises a plurality of preset identifiers, each partition corresponds to at least one preset identifier, the plurality of preset identifiers comprise a first preset identifier, and the first reference image contains a first preset identifier in the supermarket. The processing device is configured to: process the first reference image to identify a first preset identifier in the first reference image; and determine the partition in which the shopping cart is located as the positioning partition, according to the first preset identifier.

For example, in the system for positioning a supermarket shopping cart provided by at least one embodiment of the present disclosure, the partition in which the shopping cart is located corresponds to the first preset identifier in the first reference image.

For example, in the system for positioning a supermarket shopping cart provided by at least one embodiment of the present disclosure, a plurality of signal transmitters corresponding to the plurality of partitions are respectively arranged at a plurality of preset positions in the supermarket.

For example, in the system for positioning a supermarket shopping cart provided by at least one embodiment of the present disclosure, at least one signal transmitter is a Bluetooth beacon.

For example, in the system for positioning a supermarket shopping cart provided by at least one embodiment of the present disclosure, the image acquisition device comprises a camera, and an angle between a shooting direction of the camera and a horizontal direction is 45-90 degrees.

At least one embodiment of the present disclosure provides a system for positioning a supermarket shopping cart, which includes: an image acquisition device, configured to acquire a first reference image of a supermarket, in which the supermarket comprises a plurality of partitions; a memory, configured to store computer readable instructions; and a processor, configured to execute the computer readable instructions, and when the computer readable instructions are executed by the processor, cause the processor to perform the method for positioning a supermarket shopping cart according to any one of embodiments described above.

At least one embodiment of the present disclosure provides a supermarket shopping cart, which includes a cart body and the system for positioning a supermarket shopping cart according to any one of embodiments described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
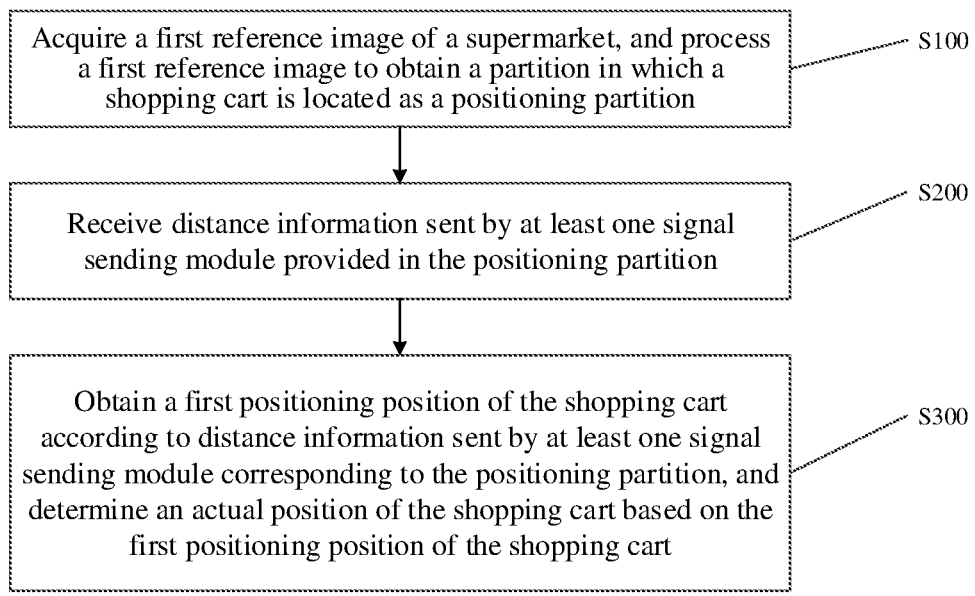
FIG. 1 illustrates a flowchart of an embodiment of a method for positioning a supermarket shopping cart provided by at least one embodiment of the present disclosure.

In order to make objects, technical solutions and advantages of the embodiments of the present disclosure, the technical solutions of the embodiments of the present disclosure will be described clearly and completely in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The terms "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to explain the present disclosure more clearly, the present disclosure will be further illustrated below with reference to preferred embodiments and the accompanying drawings. Like components in the drawings are denoted by the same reference numerals. Those skilled in the art should understand that the following detailed description is illustrative rather than restrictive, and should not limit the scope of protection of the present disclosure.

In existing technologies for an intelligent shopping cart of a supermarket, wireless or visual positioning methods are usually adopted to position the real-time position of the intelligent shopping cart. The wireless positioning method may include wireless positioning methods such as Bluetooth positioning and WIFI positioning. The current wireless positioning methods have poor positioning accuracy and are obviously interfered by the environment, and the general positioning accuracy can only reach 3-5 meters, but the distance between two adjacent rows of shelf partitions in the supermarket is about 3 meters. Therefore, the wireless positioning methods cannot meet the positioning accuracy requirements of the shopping cart in the supermarket. During a positioning process of a shopping cart, the positioning position of the shopping cart is easy to fall into shelves or other passable partitions spaced apart from the shelves, causing serious positioning deviation of the shopping cart, so that it is easy that positioning or navigation errors appear, and the user experience is bad. While the visual positioning method have higher accuracy, and a positioning position of the shopping cart with higher accuracy may be obtained through a large amount of calculation. However, when accurately positioning a shopping cart, the processing module on the shopping cart has a large amount of calculation, which requires higher performance and high cost of the processing module. The current processing module at consumer electronic level installed on the shopping cart cannot meet the requirements of the visual positioning on the performance of the processing module.

The embodiments of the present disclosure provide a method for positioning a supermarket shopping cart. The method reduces the calculation amount of positioning and improves the positioning accuracy of the shopping cart by organically combining visual positioning and wireless positioning methods. In addition, relatively accurate position information can be obtained through visual identifying and positioning technologies, thus solving the problem that Bluetooth positioning cannot position accurately. The embodiments of the present disclosure also provide a system for positioning a supermarket shopping cart and a supermarket shopping cart.

An aspect of the present disclosure provides a method for positioning a supermarket shopping cart. FIG. 1 is a flowchart of an embodiment of a method for positioning a supermarket shopping cart provided by at least one embodiment of the present disclosure. As illustrated in FIG. 1, in this embodiment, the method for positioning a supermarket shopping cart 10 includes:

S100: a first reference image of a supermarket is acquired, and a first reference image is processed to obtain a partition in which a shopping cart is located as a positioning partition.

For example, in step S100, a first reference image including preset identifiers of different partitions in the supermarket may be acquired, and a first reference image may be processed to obtain the positioning partition where the car body of the shopping cart is located.

For example, a plane of a supermarket may be divided into a plurality of partitions and a plurality of preset identifiers, and each partition is provided with at least one preset identifier. For example, a plurality of (two, three, four, etc.) preset identifiers are provided in each partition. The plurality of partitions may be classified according to product categories, for example, the plurality of partitions may include snack partitions, drink partitions, dairy partitions, fresh partitions, fruit partitions, etc. Posters having different images may be selected for the preset identifiers provided in each partition. Posters may include snack posters, drink posters, dairy posters, fruit posters, etc. Each poster corresponds to one of the divided partitions, and a poster in the first reference image may be extracted by acquiring the first reference image having the poster and then performing image recognition processing such as feature extraction on the first reference image, so that one positioning partition may be uniquely calibrated. Other identifiers may also be selected in practical application, for example, different identifiers that may be identified by image processing may be used, and the present disclosure is not limited to this.

For example, the plurality of preset identifiers include a first preset identifier, and the first reference image includes a first preset identifier in a supermarket. For example, step S100 may include: acquiring a first reference image of a supermarket; processing a first reference image to identify a first preset identifier in the first reference image; determining a partition where a shopping cart is located to be a positioning partition, according to the first preset identifier.

Figure 5:
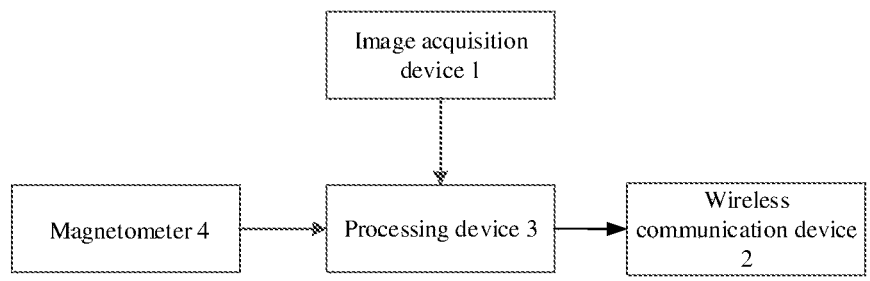
FIG. 5 illustrates a schematic diagram of an embodiment of a system for positioning a supermarket shopping cart provided by at least one embodiment of the present disclosure.

For example, the first reference image may be obtained by an image acquisition device 1 (as illustrated in FIG. 5, which will be described in detail below).

When preset identifiers are provided, the identifier positions of all preset identifiers in the supermarket are recorded previously. The first reference image including a first preset identifier is acquired, then the first reference image is processed to identify a particular preset identifier (i.e., the first preset identifier) in the first reference image, and then the position of the particular preset identifier may be obtained according to corresponding relations between different preset identifiers and identifier positions. The position of the image acquisition device 1 may be obtained according to the focal length and the shooting range of the camera in the image acquisition device 1 for acquiring images, and the position of a shopping cart may be obtained through the relative position of the image acquisition device 1 and the shopping cart. For example, in a case where the image acquisition device 1 is on the shopping cart, the position of the image acquisition device 1 may be taken as the initial position of the shopping cart, and the partition where the shopping cart is located may be obtained as a positioning partition, so as to further perform the positioning through the traditional wireless positioning methods.

For example, a first reference image including a first preset identifier may be captured by the image acquisition device 1 provided on a shopping cart, and then the first reference image may be acquired by a processing device 3 (as illustrated in FIG. 5, which will be described in detail below). The processing device 3 performs feature extraction on the first reference image and compares it with each preset identifier in order to obtain the identified first preset identifier, and determines the partition where the identified first preset identifier is located as the positioning partition. Furthermore, the position of the camera may also be obtained according to the preset position of the identified first preset identifier and the focal length and visible range of the camera in the image acquisition device 1.

For example, the partition where the shopping cart is located corresponds to the first preset identifier in the first reference image. In some examples, in a case where the first preset identifier is an identifier corresponding to a snack partition, it may be determined that the partition where the shopping cart is located is the snack partition.

In an alternative embodiment, the image acquisition device 1 may select a camera for image acquisition. For example, the shooting angle of the camera may be between 45 degrees and 90 degrees, so as to ensure that images having preset identifiers at higher positions may be captured. For example, a shooting angle of the camera may represent an angle between a shooting direction of the camera and a horizontal direction, that is, the angle between the shooting direction of the camera and the horizontal direction may be 45-90 degrees.

S200: distance information sent by at least one signal transmitter provided in the positioning partition is received.

For example, at least one signal transmitter may be provided in each of the plurality of partitions divided in the supermarket, and the provided position of each signal transmitter may be recorded. For example, the signal transmitter may be a Bluetooth beacon or the like. The distance information sent by each signal transmitter may be received through the processing device 3 in the shopping cart.

For example, each partition is provided with a plurality of (three, four, etc.) signal transmitters.

For example, a plurality of signal transmitters corresponding to a plurality of partitions are respectively provided at a plurality of preset positions in a supermarket. In step S200, distance information sent by the plurality of signal transmitters at the plurality of preset positions in the supermarket may be received.

S300: a first positioning position of the shopping cart may be obtained according to distance information sent by at least one signal transmitter corresponding to the positioning partition, and an actual position of the shopping cart may be determined based on the first positioning position of the shopping cart.

For example, the positioning partition corresponds to a plurality of signal transmitters. In step S300, the first positioning position of the shopping cart is obtained according to the distance information of the plurality of signal transmitters corresponding to the positioning partition, and the actual position of the shopping cart is determined based on the first positioning position of the shopping cart.

For example, in some embodiments, determining the actual location of the shopping cart based on the first positioning position of the shopping cart includes: taking a first positioning position of a first shopping cart as the actual position of the shopping cart.

For example, the positioning partition of the shopping cart obtained in S100 may be acquired, and the distance information respectively sent by a plurality of signal transmitters in the positioning partition may be acquired. The first positioning position of the shopping cart is calculated and obtained as an actual position output of the shopping cart, according to the plurality of distance information, and interference of the distance information sent by the signal transmitters in non-positioning partitions is eliminated, so that the positioning accuracy of the shopping cart is improved, and the calculation amount is reduced.

For example, in some embodiments, the distance information sent by a plurality of signal transmitters in the positioning partition may be controlled to the processing device 3 according to the determined positioning partition. In other embodiments, the distance information sent by all signal transmitters in the supermarket is sent to the processing device 3, and the processing device 3 may select the distance information sent by the sending modules corresponding to the positioning partition among all the acquired distance information, and then process the distance information sent by the sending modules corresponding to the positioning partition.

For example, in some embodiments, each partition corresponds to at least three signal transmitters, i.e., the positioning partition corresponds to at least three signal transmitters. In step S300, obtaining the first positioning position of the shopping cart according to the distance information sent by at least one signal transmitter corresponding to the positioning partition comprises: obtaining at least three distance information sent by at least three signal transmitters corresponding to the positioning partition; determining the minimum three distance information among the at least three distance information and position coordinates of the three signal transmitters corresponding to the minimum three distance information; and obtaining the first positioning position of the shopping cart based on a three-point weighted centroid positioning algorithm, according to the minimum three distance information and the position coordinates of the three signal transmitters.

For example, distance information may include a distance value between a signal transmitter sending the distance information and the shopping cart.

For example, in some embodiments, at least three distance information includes first distance information, second distance information, third distance information, fourth distance information, and fifth distance information. The first distance information is greater than the second distance information, the second distance information is greater than the third distance information, the third distance information is greater than the fourth distance information, and the fourth distance information is greater than the fifth distance information, then the third distance information, the fourth distance information, and the fifth distance information are the minimum three distance information among the at least three distance information.

For example, the first positioning position of the shopping cart calculated according to a plurality of distance information may be obtained through a three-point weighted centroid positioning algorithm. The positions and the distance values of the signal transmitters corresponding to the three distance information with the minimum distance values among the received plurality of distance information in the positioning partition may be selected, and then the first positioning position of the shopping cart may be obtained according to the three-point weighted centroid positioning algorithm. Specifically, it can be obtained by the following formula:

$$x = \frac{\frac{x_a}{d_0} + \frac{x_b}{d_b} + \frac{x_c}{d_c}}{\frac{1}{d_a} + \frac{1}{d_b} + \frac{1}{d_c}}$$

$$y = \frac{\frac{y_a}{d_a} + \frac{y_b}{d_b} + \frac{y_c}{d_c}}{\frac{1}{d_a} + \frac{1}{d_b} + \frac{1}{d_c}}$$

Where $(x_a, y_a)$, $(x_b, y_b)$ and $(x_c, y_c)$ are respectively the position coordinates of the three signal transmitters corresponding to the minimum three distance information, $d_a$, $d_b$ and $d_c$ are respectively the distance values of the minimum three distance information sent by the three signal transmitters, x is the abscissa of the first positioning position, and y is the ordinate of the first positioning position.

For example, the spacing between any two of the plurality of signal transmitters may be 2-4 meters.

In some embodiments, the method for positioning a supermarket shopping cart further includes step 20. In step 20, before positioning a shopping cart, the coordinates of the first reference image acquired and the position coordinates of the signal transmitter are unified to a same coordinate system.

For example, the step 20 may include: registering the positioning coordinate system of a camera with the positioning coordinate system of a supermarket, so that the positioning coordinate system of the camera and the positioning coordinate system of the supermarket are in a same world coordinate system, setting the coordinate range of the supermarket in the world coordinate system and the coordinate range of each divided partition according to the plane range of the supermarket, and recording the coordinates of each preset identifier so as to unify the coordinate system for calculation.

Figure 2:
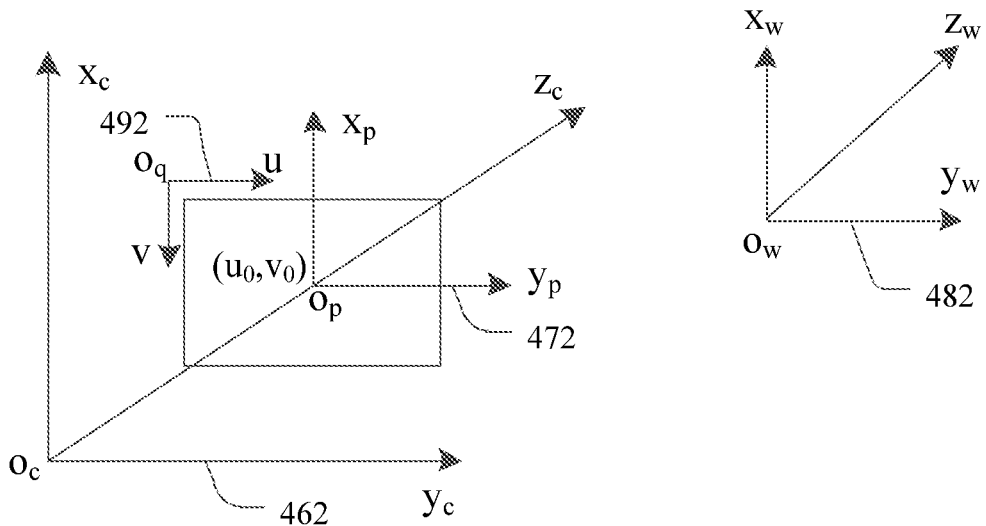
FIG. 2 is a schematic diagram of a coordinate system of a camera calibration model.

For example, FIG. 2 is a schematic diagram of a coordinate system of a camera calibration model. For example, the camera calibration uses images captured by a camera to restore objects in space. The camera calibration may use a pinhole model. As illustrated in FIG. 2, in the camera calibration model, a positioning coordinate system of a camera (i.e., camera coordinate system) 462 (i.e., $o_c$-$x_c y_c z_c$ coordinate system) is a coordinate system established based on the camera. An image coordinate system 472 (i.e., $o_p$-$x_p y_p$ coordinate system) is a coordinate system established based on an optical image of the object captured by the camera (i.e., the first reference image). A positioning coordinate system of a supermarket is a coordinate system established based on the supermarket. A world coordinate system 482 (i.e. $o_w$-$x_w y_w z_w$ coordinate system) is a coordinate system based on an object produced previously. A coordinate system 492 (i.e., $o_q$-uv coordinate system) is a pixel coordinate system of the optical image (i.e., the first reference image). The world coordinate system 482 may be freely placed according to operation requirements. The origin $o_c$ of the positioning coordinate system 462 may be located on the optical center of the camera (i.e., the projection center), and the origin $o_p$ of the image coordinate system 472 may be located on the intersection point $(u_0, v_0)$ between the optical axis of the camera and the imaging plane. The z axis of the positioning coordinate system 462 is the optical axis of the camera, and the x and y axes of the positioning coordinate system 462 are parallel to the x and y axes of the image coordinate system 472, respectively. The x and y axes of the image coordinate system 472 are also parallel to the u and v axes of the pixel coordinate system 492, respectively. The pixel coordinates (u,v) of each point in the pixel coordinate system 492 represent the number of columns and rows of pixels, and may be obtained from the camera.

It should be noted that in some embodiments, the positioning coordinate system of the supermarket may be the same as the world coordinate system 482.

For example, in the coordinate conversion process, an optical image under the image coordinate system 472 needs to be converted into the positioning coordinate system 462 and then into the world coordinate system 482. Thus, each point in the optical image may correspond to a corresponding point in the world coordinate system 482. The image coordinate system 472 and the positioning coordinate system 462 are converted to each other through the perspective projection, while the positioning coordinate system 462 and the world coordinate system 482 are converted to each other through the stiffness changes (rotation and translation).

For example, the image coordinate system 472 and the pixel coordinate system 492 are two-dimensional coordinate systems, and the positioning coordinate system 462 and the world coordinate system 482 are three-dimensional coordinate systems.

For example, the registration of the positioning coordinate system of the camera and the positioning coordinate system of the supermarket may be implemented by the following formula:

$$K = \begin{pmatrix} f_x & 0 & c_x \\ 0 & f_y & c_y \\ 0 & 0 & 1 \end{pmatrix}$$

$$Z \begin{pmatrix} u \\ v \\ 1 \end{pmatrix} = \begin{pmatrix} f_x & 0 & c_x \\ 0 & f_y & c_y \\ 0 & 0 & 1 \end{pmatrix} (RP_w + t)$$

Where K is the internal parameter matrix of the camera, fx and fy are the normalized focal lengths of the camera on the x-axis and y-axis respectively, cx is the coordinate on the x-axis of the center point of the image (e.g., the first reference image) captured by the camera, cy is the coordinate on the y-axis of the center point of the image (e.g., the first reference image) captured by the camera, [R,t] is the pose transformation matrix of the position of the camera relative to the initial position. $[u, v]^T$ are the coordinates of a space point P captured by the camera on the image coordinate system 472 of the image (e.g., the first reference image), $P_w$ are the coordinates of the space point P under the world coordinate system, u and v respectively represent the abscissa variable and the ordinate variable in the positioning coordinate system of the camera, e.g., may represent the abscissa variable and the ordinate variable of the space point P under the pixel coordinate system 492, and Z is the optical axis coordinate in the positioning coordinate system of the camera, i.e., may represent a distance from the space point P to the camera.

For example, [R,t] is the external parameter matrix of the camera, which is used to determine the position and orientation of the camera in the three-dimensional space, in order to convert the world coordinate system into the parameters used by the positioning coordinate system of the camera, R is the rotation matrix of the camera, and t is the translation matrix of the camera.

For example, the plane of the supermarket may be divided into a shelf partition for providing shelves and a passage partition for customers to pass between the shelves. The coordinate ranges of the shelf partition and the passage partition are recorded, and the passage partition is divided into a plurality of grids connected in sequence, and then the center coordinates of each grid are recorded.

For example, each partition (e.g., a dairy partition, a snack partition, etc.) of the supermarket may include at least a portion of the shelf partition and at least a portion of the passage partition. For example, each partition of the supermarket may include an area corresponding to at least one shelf in the shelf partition, and at least one grid in the passage partition.

Figure 3:
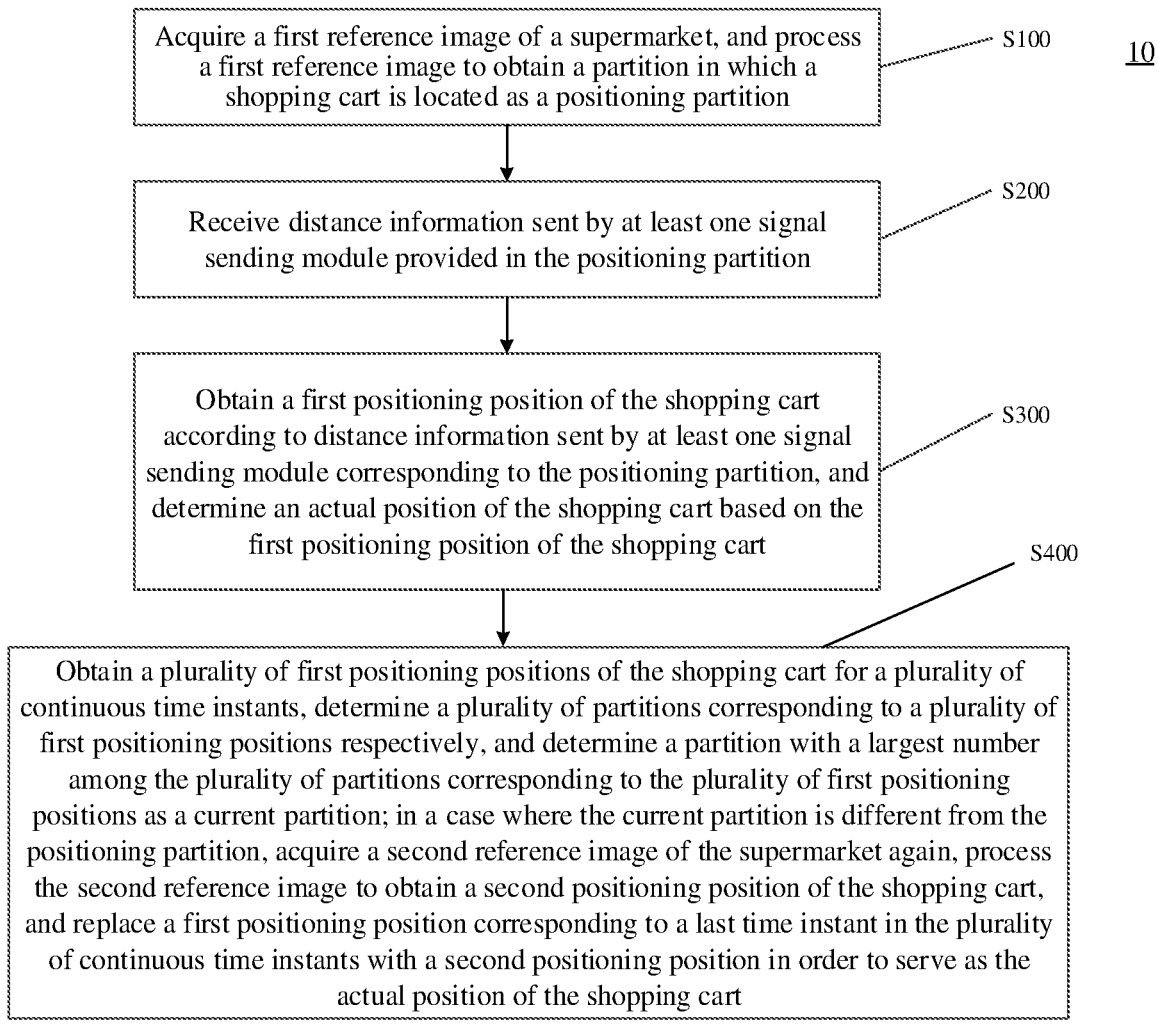
FIG. 3 illustrates a flowchart of positioning correction through visual positioning in an embodiment of a method for positioning a supermarket shopping cart provided by at least one embodiment of the present disclosure.

FIG. 3 illustrates a flowchart of positioning correction through visual positioning in an embodiment of a method for positioning a supermarket shopping cart provided by at least one embodiment of the present disclosure.

In some embodiments, as illustrated in FIG. 3, the method for positioning a supermarket shopping cart may further include:

S400: a plurality of first positioning positions of the shopping cart for a plurality of continuous time instants are obtained, a plurality of partitions corresponding to a plurality of first positioning positions respectively are determined, and a partition with a largest number among the plurality of partitions corresponding to the plurality of first positioning positions is determined as a current partition; in a case where the current partition is different from the positioning partition, a second reference image of the supermarket is acquired again, a second reference image is processed to obtain a second positioning position of the shopping cart, and a first positioning position corresponding to a last time instant in the plurality of continuous time instants is replaced with a second positioning position in order to serve as the actual position of the shopping cart.

For example, in step S400, in a case where the current partition is same as the positioning partition, the first positioning position corresponding to the last time instant in the plurality of continuous time instants is taken as the actual position of the shopping cart.

For example, in step S400, the plurality of first positioning positions may be the positioning positions obtained at the plurality of continuous time instants according to the distance information sent by at least one signal transmitter corresponding to the positioning partition.

For example, in some examples, the plurality of preset identifiers further include a second preset identifier, and the second reference image includes the second preset identifier.

For example, in step S400, a plurality of first positioning positions of the shopping cart for a plurality of continuous time instants may be obtained, partitions corresponding to the plurality of first positioning positions respectively are determined, and the partition with a largest number among them is determined as a current partition; in a case where the current partition is different from the positioning partition, a reference image (e.g., a second reference image) including a preset identifier (e.g., a second preset identifier) is acquired again by the image acquisition device 1, and the second reference image is processed to obtain a second positioning position of the shopping cart as the actual position of the shopping cart.

For example, the method for determining the second positioning position of the shopping cart may be the same as the method for determining the first positioning position of the shopping cart described above, that is, it can be obtained by the three-point weighted centroid positioning algorithm.

For example, after the second positioning position is obtained, the first positioning position for a previous time instant (i.e., the first positioning position determined at the last time instant in a plurality of continuous time instants) replaced with the second positioning position may be used as the actual position of the shopping cart.

For example, in a case where the current partition is different from the positioning partition, the original positioning partition may be replaced with the current partition in order to serve as the current positioning partition.

For example, time intervals between any two adjacent time instants in the plurality of continuous time instants may be the same; alternatively, a plurality of time intervals corresponding to a plurality of continuous time instants may be at least partially very different. In some examples, the plurality of continuous time instants may include a first time instant, a second time instant, a third time instant and a fourth time instant in sequence, and a first time interval is between the first time instant and the second time instant, a second time interval is between the second time instant and the third time instant, and a third time interval is between the third time instant and the fourth time instant, then the first time interval, the second time interval and the third time interval may all be the same, for example, 500 milliseconds. Alternatively, the first time interval, the second time interval and the third time interval may be at least partially different, for example, the first time interval and the second time interval may be the same while the first time interval and the third time interval are different. It should be noted that the last time instant in the plurality of continuous time instants is the fourth time instant.

For example, it may be determined whether the partition with the largest number of occurrences among the five partitions corresponding to five first positioning positions corresponding to the accumulated 5 time instants is the same as the positioning partition. For example, the five partitions may be respectively a drink partition, a snack partition, a drink partition, a snack partition and a snack partition. Because the five partitions include three snack partitions and two drink partitions, the partition with the largest number of occurrences among the five partitions is the snack partition, i.e. the snack partition is the current partition.

For example, in step S400, in some examples, in a case where the acquired second reference image does not include a preset identifier, the actual position of the shopping cart is unchanged, that is, the actual position of the shopping cart is the first positioning position of the shopping cart determined according to step S300.

For example, in step S400, in a case where the acquired second reference image includes a preset identifier, the position of the image acquisition device 1 acquiring the second reference image is calculated, and the position of the shopping cart is obtained as the actual position of the shopping cart according to the positional relationship between the image acquisition device 1 and the shopping cart. The actual position of the shopping cart is corrected in real time through the visual positioning, so as to prevent the positioning deviation of the shopping cart and improve the positioning accuracy of the shopping cart.

Figure 4:
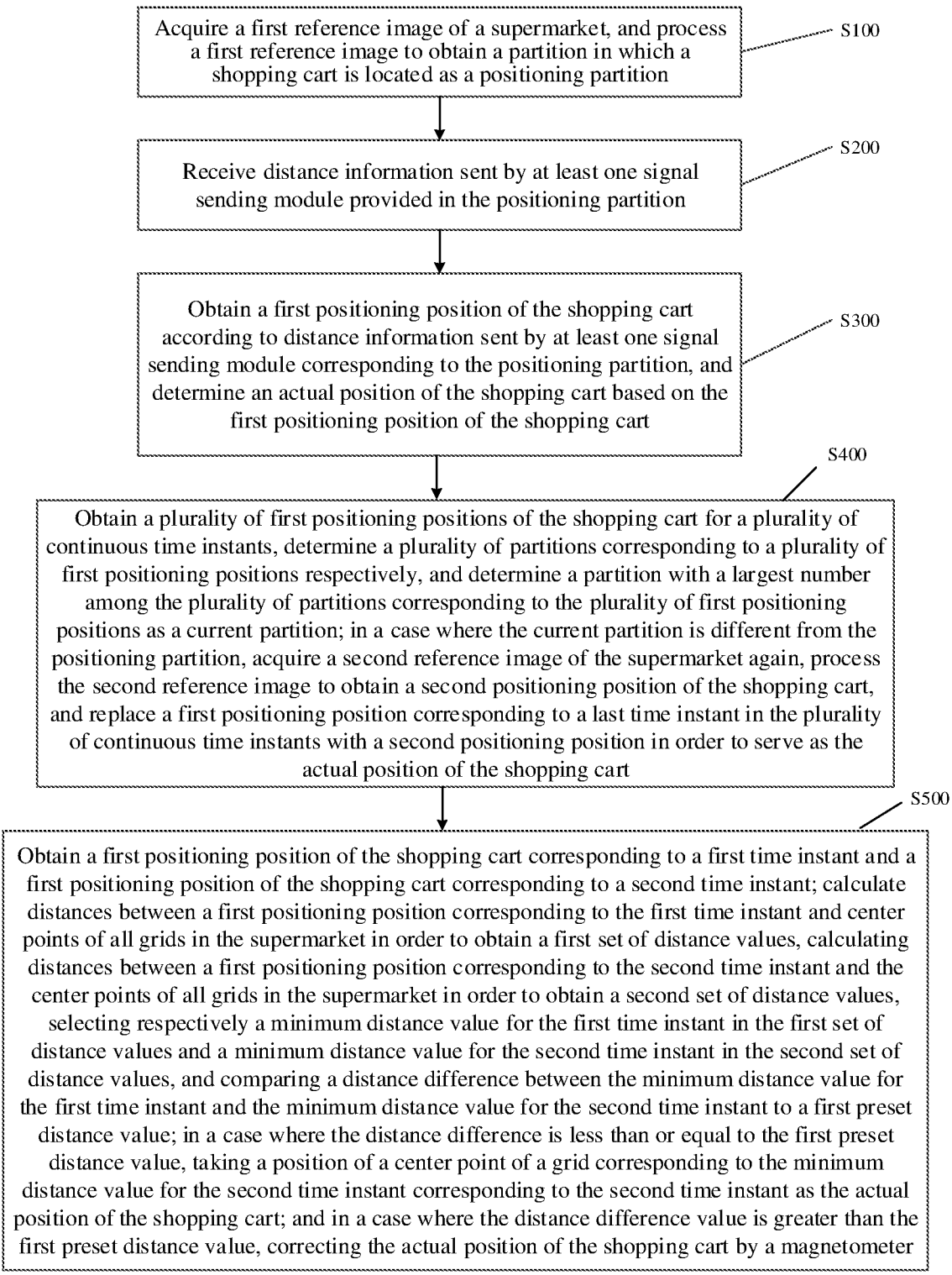
FIG. 4 illustrates a flowchart of positioning correction through a magnetometer in an embodiment of a method for positioning a supermarket shopping cart provided by at least one embodiment of the present disclosure.

FIG. 4 illustrates a flowchart of positioning correction by a magnetometer in an embodiment of a method for positioning a supermarket shopping cart provided by at least one embodiment of the present disclosure.

In some embodiments, as illustrated in FIG. 4, the method for positioning a supermarket shopping cart may further include:

S500: a first positioning position of the shopping cart corresponding to a first time instant and a first positioning position of the shopping cart corresponding to a second time instant are obtained; distances between a first positioning position corresponding to the first time instant and center points of all grids in the supermarket are calculated in order to obtain a first set of distance values, distances between a first positioning position corresponding to the second time instant and the center points of all grids in the supermarket are calculated in order to obtain a second set of distance values, a minimum distance value for the first time instant in the first set of distance values and a minimum distance value for the second time instant in the second set of distance values are selected respectively, and a distance difference between the minimum distance value for the first time instant and the minimum distance value for the second time instant is compared to a first preset distance value; in a case where the distance difference is less than or equal to the first preset distance value, a position of a center point of a grid corresponding to the minimum distance value for the second time instant corresponding to the second time instant is taken as the actual position of the shopping cart; and in a case where the distance difference value is greater than the first preset distance value, the actual position of the shopping cart is corrected by a magnetometer.

For example, the first set of distance values includes a plurality of distance values, and the minimum distance value for the first time instant is the minimum distance value among the plurality of distance values included in the first set of distance values. Similarly, the second set of distance values includes a plurality of distance values, and the minimum distance value for the second time instant is the minimum distance value among the plurality of distance values included in the second set of distance values.

For example, in step S500, first, the actual position for the adjacent first time instant (i.e., the first positioning position of the shopping carts corresponding to the first time instant) and the actual position of the shopping carts for the second time instant (i.e., the second positioning position of the shopping carts corresponding to the second time instant) may be obtained.

Then, the distances between the actual position for the first time instant (i.e., the first positioning position of the shopping cart corresponding to the first time instant) and center points of all grids and the distances between the actual position for the second time instant (i.e., the second positioning position of the shopping cart corresponding to the second time instant) and center points of all grids are respectively calculated in order to obtain two sets of distance values (i.e., the first set of distance values and the second set of distance values), the minimum distance value respectively in the two sets of distance values is selected, and the distance difference between the two minimum distance values (i.e., the minimum distance value for the first time instant and the minimum distance value for the second time instant) is compared to the first preset distance value.

Finally, in a case where the distance difference is less than or equal to the first preset distance value, the position of the center point of the grid corresponding to the minimum distance value for the second time instant corresponding to the second time instant is taken as the actual position of the shopping cart; and in a case where the distance difference is greater than the first preset distance value, the actual position of the shopping cart is corrected by a magnetometer 4.

For example, a first positioning position obtained by a traditional wireless positioning algorithm for a first time instant and a second time instant which have a certain time interval may be acquired. The distances between the coordinates of the first positioning position for the first time instant and the center points of all the passable grids in the corresponding positioning partition are calculated, and the distances between the coordinates of the first positioning position for the second time instant and the center points of all the passable grids in the corresponding positioning partition are calculated, so as to respectively obtain a plurality of distances corresponding to the first time instant and a plurality of distances corresponding to the second time instant, thereby obtaining two distance arrays. Further, the minimum values of the two distance arrays are acquired as respectively the minimum distance value for the first time instant d0min and the minimum distance value for the second time instant d1min, and the coordinates $(x(i), y(i))$ of the center point of the passable grid corresponding to d0min and the coordinates $(x1(j), y1(j))$ of the center point of the passable grid corresponding to d1min are recorded. The time interval between the first time instant and the second time instant may be selected as 500 milliseconds (ms), which is approximately equivalent to the time required by the customer for walking one step. In actual application, adaptive selection may also be made according to empirical values.

For example, the distance difference between the two minimum distance values d0min and d1min is compared with the first preset distance value, the distance difference $d=|d0min-d1min|$ is calculated, and whether d is within a first preset distance value range is determined.

For example, if d is less than or equal to the first preset distance value, it is indicated that the distance between the coordinates of the first positioning position corresponding to the second time instant and the actual point is within an error range. Then the coordinates $(x(j), y(j))$ of the center point of the passable grid corresponding to the minimum distance value for the second time instant d1min are taken as the actual position of the shopping cart, and the actual position of the shopping cart is selected to be positioned at the center of the grid, so that the situation that the positioning point of the actual position of the shopping cart floats on the shelf may be avoided.

For example, the first preset distance value may be selected according to a certain time interval, i.e., 500 milliseconds in this embodiment as a reference, in which 500 ms is about the time required for walking one step, and then the first preset distance value may be obtained by combining the size of grids. The first preset distance value may be flexibly selected according to different actual situations, for example, the first preset distance value may be 0.5-2 meters.

For example, if d is greater than the first preset distance value, the actual position of the shopping cart may be further corrected by the magnetometer 4.

In some embodiments, correcting the actual position of the shopping cart by the magnetometer 4 may include:

acquiring first angle detecting information of the magnetometer 4 at the first time instant and second angle detecting information of the magnetometer 4 at the second time instant, and calculating to obtain an angle difference between the first time instant and the second time instant;

In a case where the angle difference is less than or equal to a preset angle value, taking a position of a center point of a grid corresponding to the minimum distance value for the first time instant corresponding to the first time instant as the actual position of the shopping cart; and In a case where the angle difference is greater than the preset angle value and the distance difference between the minimum distance value for the first time instant and the minimum distance value for the second time instant is less than or equal to a second preset distance value, taking the position of the center point of the grid corresponding to the minimum distance value for the second time instant corresponding to the second time instant as the actual position of the shopping cart.

For example, the angle difference may represent a difference between an angle value in the first angle detecting information and an angle value in the second angle detecting information.

For example, in this embodiment, the preset angle value may be 90 degrees, that is, if the angle difference is less than or equal to 90 degrees, which indicates that the distance between the coordinates of the first positioning position corresponding to the second time instant and the actual point exceeds the error range, then the coordinates $(x(i),y(i))$ of the center point of the passable grid corresponding to the minimum distance value for the first time instant d0min is output as the actual position of the final shopping cart by default.

For example, if the angle difference is greater than 90 degrees, it is indicated that the user has turned, and it may be determined whether the distance difference d between the minimum distance value for the first time instant and the minimum distance value for the second time instant is within the range of the second preset distance value. The user has turned, and the second preset distance value should be set considering factors such as the width of a shelf. If the angle difference is less than or equal to the second preset distance value, the coordinates (x(j),y(j)) of the center point of the passable grid corresponding to the minimum distance value for the second time instant d1min are output as the actual position of the shopping cart.

For example, the first preset distance value and the second preset distance value may be set according to the empirical values obtained through multiple tests of actual scenes, and may be calculated by using user motion speed and step length. The second preset distance value needs to be greater than the first preset distance value, for example, the second preset distance value may be a value between 1.5 and 3 meters.

For example, in a case where the angle difference is greater than the preset angle value and the distance difference between the minimum distance value for the first time instant and the minimum distance value for the second time instant is greater than the second preset distance value, the center point of the grid corresponding to the minimum distance value for the first time instant corresponding to the first time instant is taken as the actual position of the shopping cart. In a case where the angle difference is greater than the preset angle value and the distance difference between the minimum distance value for the first time instant and the minimum distance value for the second time instant is greater than the second preset distance value, which indicates that the first positioning position corresponding to the second time instant is unreliable, then the coordinates (x(i),y(i)) of the center point of the passable grid corresponding to the minimum distance value for the first time instant d0min are output as the actual position of the shopping cart.

The method for positioning a supermarket shopping cart of the present disclosure mainly positions an indoor shopping cart of a supermarket through a wireless positioning method, implements the correction of a path and a fixed-point position by combining the visual recognition technology and the magnetometer 4 sensor, so that the positioning accuracy of the shopping cart may be effectively improved, the situation that coordinates obtained through positioning appear in impassable partitions (shelf and other partitions) may be prevented, a positioning error between the corrected coordinates of the positioning point and the real coordinates is within a controllable range, and a positioning error between the corrected coordinates of the positioning point and the positioning coordinates obtained by a wireless positioning algorithm is also within a controllable range. The deviation is corrected using the accurate positioning coordinates obtained through the visual positioning, which overcomes the problem of accumulated errors existing in the correction using positions for historical time instants. Determining the direction angle combined with the magnetometer 4 sensor, so that the user's state of turning or going straight may be estimated previously, and the accuracy of threshold judgment may be improved.

Based on the same principles, according to another aspect of the present disclosure, at least one embodiment of the present disclosure also discloses a system for positioning a supermarket shopping cart. FIG. 5 illustrates a schematic diagram of an embodiment of a system for positioning a supermarket shopping cart provided by at least one embodiment of the present disclosure.

For example, as illustrated in FIG. 5, in this embodiment, the system for positioning a supermarket shopping cart comprises a processing device 3, an image acquisition device 1, a wireless communication device 2 and a magnetometer 4. The image acquisition device 1, the wireless communication device 2 and the magnetometer 4 may be arranged on the cart body of a shopping cart. It should be noted that the components of the system for positioning a supermarket shopping cart illustrated in FIG. 5 are only exemplary and not restrictive, and the system for positioning a supermarket shopping cart may also have other components according to actual application requirements.

For example, the processing device 3, the image acquisition device 1 and the magnetometer 4 may be interconnected by a bus system, a network, and/or other forms of connection mechanisms (not shown). The network may include a wireless network, a wired network, and/or any combination of the wireless network and the wired network. The wireless communication device 2 may wirelessly communicate with other components in the system for positioning a supermarket shopping cart.

For example, the processing device 3, the image acquisition device 1, the wireless communication device 2 and the magnetometer 4 may communicate with each other directly or indirectly.

For example, the image acquisition device 1 may acquire a first reference image, a second reference image and the like. For example, a supermarket comprises a plurality of partitions and a plurality of preset identifiers, and each partition comprises at least one preset identifier. For example, the plurality of preset identifiers comprise a first preset identifier and a second preset identifier, the first reference image contains the first preset identifier in the supermarket, and the second reference image contains the second preset identifier.

For example, the first reference image and the second reference image may be original images directly acquired by the image acquisition device 1 or images obtained after preprocessing the original images.

For example, the first reference image and the second reference image have the same size.

For example, the wireless communication device 2 may receive distance information sent by a plurality of signal transmitters at a plurality of preset positions in the supermarket.

For example, the plurality of signal transmitters are respectively arranged at a plurality of preset positions in the supermarket. Each signal transmitter may be a Bluetooth beacon.

For example, the processing device 3 may be configured to receive a first reference image, process the first reference image to obtain and determine a partition where the cart body of a shopping cart is located as a positioning partition, obtain a first positioning position of the shopping cart according to the distance information sent by at least one signal transmitter corresponding to the positioning partition, and determine the actual position of the shopping cart based on the first positioning position of the shopping cart.

For example, the partition where the shopping cart is located corresponds to the first preset identifier in the first reference image.

For example, the image acquisition apparatus 1 may include a camera, and the camera may be provided as one or more cameras and be configured to capture the first reference image. The camera may be, for example, a camera of a smart phone, a camera of a tablet computer, or a network camera, etc.

For example, the angle between the shooting direction of the camera and the horizontal direction may be selected according to the actual setting height of the identified preset identifier. In some examples, the angle between the shooting direction of the camera and the horizontal direction may be 45-90 degrees. For example, the angle between the shooting direction of the camera and the horizontal direction is 60 degrees, so that the shooting range of the camera may cover the preset identifiers set conventionally.

For example, the wireless communication device 2 may be a Bluetooth communication device, a Wi-Fi communication device, or the like.

For example, the processing device 3 may be a processing device having data processing capability and/or program executing capability. The processing device 3 includes, but is not limited to, one or more of processors, single chip microcomputers, digital signal processors (DSP), application specific integrated circuits (ASIC) and other devices. The processor may be, for example, a central processing unit (CPU), a field programmable gate array (FPGA), a tensor processing unit (TPU), etc. The processing device 3 may include one or more chips of the above devices.

For example, in some examples, the processing device 3 is configured to: take the first positioning position of the first shopping cart as the actual position of the shopping cart.

For example, in some examples, the processing device 3 is further configured to: obtain a plurality of first positioning positions of the shopping cart for a plurality of continuous time instants, determine a plurality of partitions corresponding to the plurality of first positioning positions respectively, and determine a partition with the largest number among the plurality of partitions corresponding to the plurality of first positioning positions as a current partition. In a case where the current partition is different from the positioning partition, the image acquisition device 1 is further configured to acquire a second reference image of the supermarket again, and the processing device 3 is further configured to process the second reference image to obtain a second positioning position of the shopping cart, and replace a first positioning position corresponding to a last time instant in the plurality of continuous time instants with the second positioning position in order to serve as the actual position of the shopping cart. In a case where the current partition is same as the positioning partition, the processing device 3 is further configured to take the first positioning position corresponding to the last time instant in the plurality of continuous time instants as the actual position of the shopping cart.

For example, the supermarket includes a shelf partition and a passage partition, and the passage partition includes a plurality of grids connected in sequence. In some examples, the processing device 3 is further configured to: obtain a first positioning position of the shopping cart corresponding to a first time instant and a first positioning position of the shopping cart corresponding to a second time instant; calculate distances between a first positioning position corresponding to the first time instant and center points of all grids in the supermarket in order to obtain a first set of distance values, calculate distances between a first positioning position corresponding to the second time instant and the center points of all grids in the supermarket in order to obtain a second set of distance values, select respectively a minimum distance value for the first time instant in the first set of distance values and a minimum distance value for the second time instant in the second set of distance values, and compare a distance difference between the minimum distance value for the first time instant and the minimum distance value for the second time instant to a first preset distance value; in a case where the distance difference is less than or equal to the first preset distance value, take a position of a center point of a grid corresponding to the minimum distance value for the second time instant corresponding to the second time instant as the actual position of the shopping cart; and in a case where the distance difference value is greater than the first preset distance value, correct the actual position of the shopping cart by a magnetometer.

For example, in some examples, the processing device 3 is further configured to: obtain first angle detecting information of the magnetometer at the first time instant and second angle detecting information of the magnetometer at the second time instant, and calculate an angle difference between the first time instant and the second time instant; in a case where the angle difference is less than or equal to a preset angle value, take a position of a center point of a grid corresponding to the minimum distance value for the first time instant corresponding to the first time instant as the actual position of the shopping cart; in a case where the angle difference is greater than the preset angle value and the distance difference is less than or equal to a second preset distance value, take the position of the center point of the grid corresponding to the minimum distance value for the second time instant corresponding to the second time instant as the actual position of the shopping cart; and in a case where the angle difference is greater than the preset angle value and the distance difference is greater than the second preset distance value, take the position of the center point of the grid corresponding to the minimum distance value for the first time instant corresponding to the first time instant as the actual position of the shopping cart.

For example, each partition corresponds to at least three signal transmitters, i.e., the positioning partition corresponds to at least three signal transmitters. In some examples, the processing device 3 is configured to: obtain at least three distance information sent by at least three signal transmitters corresponding to the positioning partition; determine the minimum three distance information among the at least three distance information and position coordinates of the three signal transmitters corresponding to the minimum three distance information; and obtain the first positioning position of the shopping cart based on a three-point weighted centroid positioning algorithm, according to the minimum three distance information and the position coordinates of three signal transmitters.

For example, in some examples, the processing device 3 is further configured to: process the first reference image to identify a first preset identifier in the first reference image; and determine the partition in which the shopping cart is located as the positioning partition, according to the first preset identifier.

It should be noted that the detailed description of the system for positioning a supermarket shopping cart illustrated in FIG. 5 implementing the method for positioning the super shopping cart may refer to the relevant description in the embodiments of the method for positioning a super shopping cart, and the repetition will not be repeated.

At least one embodiment of the present disclosure also discloses a system for positioning a supermarket shopping cart. The system for positioning a supermarket shopping cart comprises: an image acquisition device, a memory and a processor.

For example, the image acquisition device is configured to acquire a first reference image of a supermarket. For example, the supermarket includes a plurality of partitions.

For example, the memory is configured to store computer readable instructions. The processor is configured to execute the computer readable instructions. When the computer readable instructions are executed by the processor, the method for positioning a supermarket shopping cart according to any one of the above embodiments may be performed.

For example, the image acquisition device, the memory, and the processor may be interconnected by a bus system, a network, and/or other forms of connection mechanisms (not shown). The network may include a wireless network, a wired network, and/or any combination of the wireless network and the wired network.

For example, components such as the image acquisition device, the memory, and the processor may communicate with each other directly or indirectly.

For example, the processor may be a central processing unit (CPU) or other forms of processing units having data processing capability and/or program executing capability, such as a field programmable gate array (FPGA) or tensor processing unit (TPU), etc. The processor may control other components in the backlight brightness processing system to perform desired functions. For example, the central processing unit (CPU) may be an X86 or ARM architecture.

For example, the memory may include any combination of one or more computer program products, the computer program products may include various forms of computer readable storage media, such as a volatile memory and/or non-volatile memory. The volatile memory may include, for example, a random access memory (RAM) and/or cache, etc. The non-volatile memory may include, for example, a read only memory (ROM), hard disk, erasable programmable read only memory (EPROM), portable compact disk read only memory (CD-ROM), USB memory, flash memory, and the like. One or more computer instructions may be stored on the memory, and the processor may execute the computer instructions to implement various functions. Various application programs, various data and various data used and/or generated by the application programs may also be stored in the computer readable storage media.

It should be noted that the detailed description of the positioning process of the method for positioning a supermarket shopping cart may refer to the relevant description in the embodiments of the method for positioning a supermarket shopping cart, and the repetition will not be repeated.

According to still another aspect of the present disclosure, the embodiments of the present disclosure also discloses a supermarket shopping cart, and the supermarket shopping cart comprises a cart body and the system for positioning a supermarket shopping cart according to any one of the above embodiments.

For example, with respect to the system for positioning a supermarket shopping cart illustrated in FIG. 5, the processing device 3 may be arranged on a terminal of the cart body or in a mobile terminal outside the cart body, for example, in a mobile phone or a tablet computer arranged outside the cart body. The data transmission with the processing device 3 in the external mobile terminal is performed through the wireless communication device 2 in the system for positioning a supermarket shopping cart in order to transmit the received distance information. When the processing device 3 is in the external mobile terminal, the processing device 3 may further obtain a reference image (e.g., the first reference image and the second reference image, etc.) acquired by the image acquisition device 1 through the wireless communication device 2, and then the reference image is sent to the processing device 3 for identifying a preset identifier.

Figure 6:
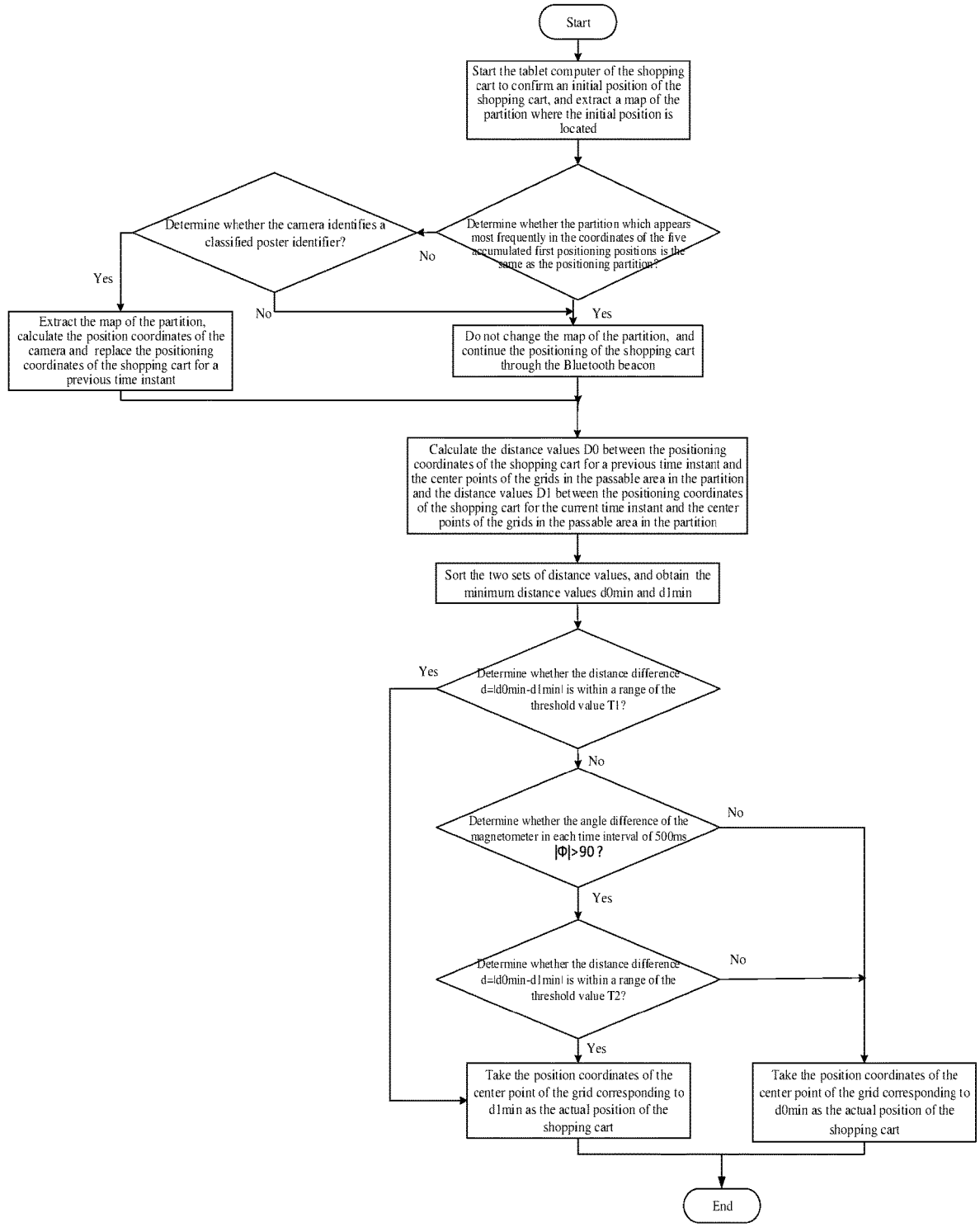
FIG. 6 illustrates an application flowchart of an embodiment of a shopping cart provided by at least one embodiment of the present disclosure.

FIG. 6 illustrates an application flowchart of an embodiment of a shopping cart provided by at least one embodiment of the present disclosure.

The present disclosure will be further illustrated through a specific embodiment below. As illustrated in FIG. 6, a shopping cart is provided with a tablet computer, the tablet computer is equipped with a processing device and a wireless transmission device, and the shopping cart may also be provided with a camera, which is in communication connection with the processing device. First, the tablet computer of the shopping cart is started to confirm an initial position of the shopping cart, and a map of the partition where the initial position is located is extracted. For example, when a user uses the supermarket shopping cart, the tablet computer keeps an on state, and the processing device of the tablet computer controls the camera to capture a first reference image which comprises a first poster (i.e., a first preset identifier) in a supermarket. The processing device receives and processes the reference image in order to obtain the partition where the initial position of the shopping cart is located (i.e., a positioning partition), and then extract the map of the partition where the initial position is located. The processing device may also receive distance information sent by a plurality of Bluetooth beacons, extract the distance information from the Bluetooth beacons in the partition where the initial position of the shopping cart is located, select the minimum three distance information according to the received plurality of distance information, and obtain the first positioning position of the shopping cart through a three-point weighted centroid positioning algorithm as the actual position of the shopping cart.

Then, the processing device may obtain one first positioning position through the three-point weighted centroid positioning algorithm after a certain time interval each time, and the processing device determines whether the partition which appears most frequently in the coordinates of the five accumulated first positioning positions is the same as the positioning partition of the shopping cart obtained through the visual positioning using the camera; if so, the map of the partition is not changed, and the positioning of the shopping cart through the Bluetooth beacon is continued; if not, the camera acquires a second reference image and determines whether the camera identifies a classified poster identifier. For example, the camera acquires the second reference image again, in a case where the camera identifies the classified poster identifier, the map of the partition corresponding to the classified poster identifier for the current time instant is extracted, the position coordinates of the camera are calculated, and the positioning coordinates of the shopping cart for a previous time instant (i.e., the actual position of the shopping cart) is replaced. That is, a second positioning position of the shopping cart may be obtained through visual positioning based on the second reference image, and the first positioning position of the shopping cart is replaced by the second positioning position in order to serve as the actual position of the shopping cart. In a case where the camera identifies the classified poster identifier, for example, the second reference image may include a second poster (i.e., a second preset identifier). In a case where the camera does not identify the classified poster identifier, the map of the partition does not change, and positing the shopping cart through the Bluetooth beacon is continued. Then, the processing device records the distance values D0 between the positioning coordinates of the shopping cart for a previous time instant and the center points of the grids in the passable partition in the partition and the distance values D1 between the positioning coordinates of the shopping cart for the current time instant and the center points of the grids in the passable partition in the partition in order to obtain two sets of distance values. Then, the two sets of distance values are sorted, the minimum distance values d0min and d1min in the two sets of distance values are obtained, and whether the distance difference $d=|d0min-d1min|$ is within a range of a first preset distance value T1 is determined. In a case where d is within the range of the first preset distance value T1, the coordinates $(x(j), y(j))$ of the center point of the passable grid corresponding to d1min are output as the actual position of the shopping cart; and in a case where d is not within the range of the first preset distance value T1, the actual position of the shopping cart is further corrected by the magnetometer 4. For example, it is determined whether the angle difference or angle of the magnetometer 4 in each time interval of 500 ms is greater than 90 degrees. In a case where the angle difference or angle is less than or equal to 90 degrees, the center point of the grid corresponding to the minimum distance value d1min corresponding to the second time instant is taken as the actual position of the shopping cart. In a case where the angle difference or angle is greater than 90 degrees, then it is determined whether the distance difference d is within a second preset distance value T2. In a case where the distance difference d is less than or equal to the second preset distance value T2, the position coordinates of the center point of the grid corresponding to d1min are output as the actual position of the shopping cart, that is, the position coordinates of the center point of the grid corresponding to the minimum distance value d1min corresponding to the second time instant are taken as the actual position of the shopping cart. And in a case where the distance difference d is greater than the second preset distance value T2, the center point of the grid corresponding to d0min is output as the actual position of the shopping cart, that is, the center point of the grid corresponding to the minimum distance value d0min corresponding to the first time instant is taken as the actual position of the shopping cart.

The present disclosure may have the beneficial effects as follows.

The method for positioning a supermarket shopping cart, the system for positioning a supermarket shopping cart and the supermarket shopping cart provided by the embodiments of the present disclosure reduce the calculation amount of the positioning and improve the positioning accuracy of the supermarket shopping cart by organically combining the visual positioning and wireless positioning methods. In addition, relatively accurate position information may be obtained through visual identifying and positioning technologies, thus solving the problem that Bluetooth positioning cannot position accurately. Specifically, when positioning a supermarket shopping cart, the partition where the shopping cart is located in the supermarket is obtained as the positioning partition of the shopping cart by acquiring a reference image which includes the preset identifiers corresponding to different partitions in the supermarket and performing the image processing on the reference image. The distance information sent by the signal transmitters located at different preset positions in the supermarket may be received by the wireless communication device on the shopping cart, and the processing device selects the distance information sent by the plurality of signal transmitters located in the positioning partition, and calculates and outputs the first positioning position of the shopping cart as the actual position of the shopping cart. The visual positioning is performed by acquiring reference images in order to determine the positioning partition of the shopping cart, and the distance information from the signal transmitters in the positioning partition is selected in order to calculate the position of the shopping cart, so that the distance information which is easy to cause positioning errors may be eliminated, thus improving the positioning accuracy of the shopping cart.

For the present disclosure, the following statements should be noted:

(1) The accompanying drawings involve only the structure(s) in connection with the embodiment(s) of the present disclosure, and for other structure(s), reference can be made to common design(s).

(2) The embodiments of the present disclosure and features in the embodiments may be combined with each other to obtain new embodiments if they do not conflict with each other.

Obviously, the above embodiments of the present disclosure are merely examples for clearly explaining the present disclosure, and are not limitations on the implementations of the present disclosure. For those of ordinary skill in the art, other different forms of changes or modifications may be made on the basis of the above description. It is not possible to list all the embodiments here, and any obvious changes or modifications that belong to the technical schemes of the present disclosure are still within the protection scope of the present disclosure. The scope of the present disclosure is defined by the accompanying claims.

What is claimed is:

1. A method for positioning a shopping cart in a supermarket, comprising:
    acquiring a first reference image of the supermarket, and processing a first reference image to obtain a positioning partition in which the shopping cart is located, wherein the supermarket comprises a plurality of partitions;
    receiving distance information sent by at least one signal transmitter provided in the positioning partition, wherein each partition is provided with at least one signal transmitter; and
    obtaining a first positioning position of the shopping cart, according to the distance information sent by at least one signal transmitter corresponding to the positioning partition, and determining an actual position of the shopping cart based on the first positioning position of the shopping cart;
    wherein determining the actual position of the shopping cart based on the first positioning position of the shopping cart, comprises:
    taking a first positioning position of the shopping cart as the actual position of the shopping cart.

2. The method according to claim 1, further comprising:
    obtaining a plurality of first positioning positions of the shopping cart for a plurality of continuous time instants, determining a plurality of partitions corresponding to a plurality of first positioning positions respectively, and determining a partition with a largest number among the plurality of partitions corresponding to the plurality of first positioning positions as a current partition;

in a case where the current partition is different from the positioning partition, acquiring a second reference image of the supermarket again, processing the second reference image to obtain a second positioning position of the shopping cart, and replacing a first positioning position corresponding to a last time instant in the plurality of continuous time instants with a second positioning position in order to serve as the actual position of the shopping cart; and in a case where the current partition is the same as the positioning partition, taking the first positioning position corresponding to the last time instant in the plurality of continuous time instants as the actual position of the shopping cart.

3. The method according to claim 1, wherein the supermarket comprises a shelf partition and a passage partition, and the passage partition comprises a plurality of grids connected in sequence; and wherein the method for positioning the shopping cart in the supermarket further comprises:

obtaining a first positioning position of the shopping cart corresponding to a first time instant and a first positioning position of the shopping cart corresponding to a second time instant;

calculating distances between a first positioning position corresponding to the first time instant and center points of all grids in the supermarket in order to obtain a first set of distance values, calculating distances between a first positioning position corresponding to the second time instant and the center points of all grids in the supermarket in order to obtain a second set of distance values, selecting respectively a minimum distance value for the first time instant in the first set of distance values and a minimum distance value for the second time instant in the second set of distance values, and comparing a distance difference between the minimum distance value for the first time instant and the minimum distance value for the second time instant to a first preset distance value;

in a case where the distance difference is less than or equal to the first preset distance value, taking a position of a center point of a grid corresponding to the minimum distance value for the second time instant corresponding to the second time instant as the actual position of the shopping cart; and in a case where the distance difference value is greater than the first preset distance value, correcting the actual position of the shopping cart by a magnetometer.

4. The method according to claim 3, wherein correcting the actual position of the shopping cart by a magnetometer sensor comprises:

obtaining first angle detecting information of the magnetometer at the first time instant and second angle detecting information of the magnetometer at the second time instant, and calculating to obtain an angle difference between the first time instant and the second time instant;

in a case where the angle difference is less than or equal to a preset angle value, taking a position of a center point of a grid corresponding to the minimum distance value for the first time instant corresponding to the first time instant as the actual position of the shopping cart;

in a case where the angle difference is greater than the preset angle value and the distance difference is less than or equal to a second preset distance value, taking the position of the center point of the grid corresponding to the minimum distance value for the second time instant corresponding to the second time instant as the actual position of the shopping cart; and in a case where the angle difference is greater than the preset angle value and the distance difference is greater than the second preset distance value, taking the position of the center point of the grid corresponding to the minimum distance value for the first time instant corresponding to the first time instant as the actual position of the shopping cart.

5. The method according to claim 1, wherein the positioning partition corresponds to at least three signal transmitters, and wherein obtaining the first positioning position of the shopping cart according to the distance information sent by at least one signal transmitter corresponding to the positioning partition comprises:

obtaining at least three pieces of distance information sent by at least three signal transmitters corresponding to the positioning partition;

determining three minimum ones among at least three pieces of distance information and position coordinates of three signal transmitters corresponding to the minimum three distance information; and obtaining the first positioning position of the shopping cart based on a three-point weighted centroid positioning algorithm, according to the minimum three distance information and the position coordinates of the three signal transmitters.

6. The method according to claim 1, wherein the supermarket further comprises a plurality of preset identifiers, each partition corresponds to at least one preset identifier, the plurality of preset identifiers comprise a first preset identifier, and the first reference image contains a first preset identifier in the supermarket, and wherein processing the first reference image to obtain the partition in which the shopping cart is located as the positioning partition, comprises:

processing the first reference image to identify a first preset identifier in the first reference image; and determining the partition in which the shopping cart is located as the positioning partition, according to the first preset identifier.

7. The method according to claim 6, wherein the partition in which the shopping cart is located corresponds to the first preset identifier in the first reference image; and wherein the plurality of preset identifiers further comprise a second preset identifier, and a second reference image contains the second preset identifier.

8. A system for positioning a shopping cart in a supermarket, comprising:

an image acquisition device, configured to acquire a first reference image of the supermarket, wherein the supermarket comprises a plurality of partitions;

a memory, configured to store computer readable instructions; and a processor, configured to execute the computer readable instructions, wherein when the computer readable instructions are executed by the processor, cause the processor to perform the method for positioning the shopping cart according to claim 1.

9. A system for positioning a shopping cart in a supermarket, comprising:

an image acquisition device, configured to acquire a first reference image of the supermarket, wherein the supermarket comprises a plurality of partitions;

a wireless communication device, configured to receive distance information sent by a plurality of signal transmitters in the supermarket; and a processing device, configured to receive a first reference image, process the first reference image to obtain and determine a partition in which the shopping cart is located as a positioning partition, obtain a first positioning position of the shopping cart according to distance information sent by at least one signal transmitter corresponding to the positioning partition, and determine an actual position of the shopping cart based on the first positioning position of the shopping cart, wherein the processing device is configured to: take the first positioning position of the shopping cart as the actual position of the shopping cart.

10. The system according to claim 9, wherein the processing device is further configured to: obtain a plurality of first positioning positions of the shopping cart for a plurality of continuous time instants, determine a plurality of partitions corresponding to a plurality of first positioning positions respectively, and determine a partition with a largest number among the plurality of partitions corresponding to the plurality of first positioning positions as a current partition;

in a case where the current partition is different from the positioning partition, the image acquisition device is further configured to acquire a second reference image of the supermarket again, and the processing device is further configured to process a second reference image to obtain a second positioning position of the shopping cart, and replace a first positioning position corresponding to a last time instant in the plurality of continuous time instants with a second positioning position in order to serve as the actual position of the shopping cart; and in a case where the current partition is the same as the positioning partition, the processing device is further configured to take the first positioning position corresponding to the last time instant in the plurality of continuous time instants as the actual position of the shopping cart.

11. The system according to claim 9, further comprising a magnetometer fixable on the shopping cart;

wherein the supermarket comprises a shelf partition and a passage partition, and the passage partition comprises a plurality of grids connected in sequence; and wherein the processing device is further configured to:

obtain a first positioning position of the shopping cart corresponding to a first time instant and a first positioning position of the shopping cart corresponding to a second time instant;

calculate distances between a first positioning position corresponding to the first time instant and center points of all grids in the supermarket in order to obtain a first set of distance values, calculate distances between a first positioning position corresponding to the second time instant and the center points of all grids in the supermarket in order to obtain a second set of distance values, select respectively a minimum distance value for the first time instant in the first set of distance values and a minimum distance value for the second time instant in the second set of distance values, and compare a distance difference between the minimum distance value for the first time instant and the minimum distance value for the second time instant to a first preset distance value;

in a case where the distance difference is less than or equal to the first preset distance value, take a position of a center point of a grid corresponding to the minimum distance value for the second time instant corresponding to the second time instant as the actual position of the shopping cart; and in a case where the distance difference value is greater than the first preset distance value, correct the actual position of the shopping cart by the magnetometer.

12. The system according to claim 11, wherein the processing device is further configured to:

obtain first angle detecting information of the magnetometer at the first time instant and second angle detecting information of the magnetometer at the second time instant, and calculate an angle difference between the first time instant and the second time instant;

in a case where the angle difference is less than or equal to a preset angle value, take a position of a center point of a grid corresponding to the minimum distance value for the first time instant corresponding to the first time instant as the actual position of the shopping cart;

in a case where the angle difference is greater than the preset angle value and the distance difference is less than or equal to a second preset distance value, take the position of the center point of the grid corresponding to the minimum distance value for the second time instant corresponding to the second time instant as the actual position of the shopping cart; and in a case where the angle difference is greater than the preset angle value and the distance difference is greater than the second preset distance value, take the position of the center point of the grid corresponding to the minimum distance value for the first time instant corresponding to the first time instant as the actual position of the shopping cart.

13. The system according to claim 9, wherein the positioning partition corresponds to at least three signal transmitters, and wherein the processing device is configured to: obtain at least three pieces of distance information sent by at least three signal transmitters corresponding to the positioning partition; determine the minimum three distance information among at least three pieces of distance information and position coordinates of three signal transmitters corresponding to the minimum three distance information; and obtain the first positioning position of the shopping cart based on a three-point weighted centroid positioning algorithm, according to the minimum three distance information and the position coordinates of three signal transmitters.

14. The system according to claim 9, wherein the supermarket further comprises a plurality of preset identifiers, each partition corresponds to at least one preset identifier, the plurality of preset identifiers comprise a first preset identifier, and the first reference image contains a first preset identifier in the supermarket, and wherein the processing device is configured to: process the first reference image to identify a first preset identifier in the first reference image; and determine the partition in which the shopping cart is located as the positioning partition, according to the first preset identifier.

15. The system according to claim 14, wherein the partition in which the shopping cart is located corresponds to the first preset identifier in the first reference image.

16. The system according to claim 9, wherein a plurality of signal transmitters corresponding to the plurality of partitions are respectively arranged at a plurality of preset positions in the supermarket.

17. The system according to claim 9, wherein the image acquisition device comprises a camera, and an angle between a shooting direction of the camera and a horizontal direction is 45-90 degrees.

18. A shopping cart in a supermarket, comprising a cart body and the system for positioning the shopping cart according to claim 9.

* * * * *